(12) United States Patent
Fan et al.

(10) Patent No.: US 11,560,500 B2
(45) Date of Patent: Jan. 24, 2023

(54) OPTICAL ADHESIVE AND OPTICAL LAMINATES AND LENSES FORMED WITH SAME

(71) Applicant: HOYA Optical Labs of America, Inc., Lewisville, TX (US)

(72) Inventors: Ping Fan, Ramsey, MN (US); Hannah Vu, Ramsey, MN (US); James Mulligan, Ramsey, MN (US); Steven Harold Nahm, Ramsey, MN (US); David J. Kissel, Ramsey, MN (US); Richard Blacker, Ramsey, MN (US)

(73) Assignee: HOYA Optical Labs of America, Inc., Lewisville, TX (US)

( * ) Notice: Subject to any disclaimer, the term of this patent is extended or adjusted under 35 U.S.C. 154(b) by 302 days.

(21) Appl. No.: 16/101,368

(22) Filed: Aug. 10, 2018

(65) Prior Publication Data
US 2019/0048237 A1   Feb. 14, 2019

Related U.S. Application Data

(60) Provisional application No. 62/544,678, filed on Aug. 11, 2017.

(51) Int. Cl.
*C09J 175/04*  (2006.01)
*C08G 18/40*  (2006.01)
(Continued)

(52) U.S. Cl.
CPC ....... *C09J 175/04* (2013.01); *B29D 11/00009* (2013.01); *B29D 11/0073* (2013.01);
(Continued)

(58) Field of Classification Search
CPC ..... C09J 175/04; C09J 2301/408; B32B 7/12; B32B 27/08; B32B 27/306; B32B 27/36; B32B 27/40; B32B 2307/412; B32B 2307/42; B32B 2329/04; B32B 2367/00; B32B 2375/00; B32B 2551/00; B32B 37/1207; C08G 18/12; C08G 18/246; C08G 18/4018; C08G 18/44; C08G 18/48; C08G 18/4854; C08G 18/758; C08K 5/0041;
(Continued)

(56) References Cited

U.S. PATENT DOCUMENTS 5,907,012 A   5/1999  Voss et al.
6,096,425 A   8/2000  Smith
(Continued)

FOREIGN PATENT DOCUMENTS

WO   WO 2013/099640 A1   7/2013

OTHER PUBLICATIONS

Rouse, Margaret; et al., "What is Ambient Temperature?", Jul. 5, 2020, p. 1 (Year: 2020).*
(Continued)

*Primary Examiner* — Callie E Shosho
*Assistant Examiner* — Steven A Rice
(74) *Attorney, Agent, or Firm* — Inskeep IP Group, Inc.

(57) ABSTRACT

The present invention pertains to polyurethane-urea based optical adhesives for formation of optical film laminates, optically functional film laminates, and ophthalmic or eyeglass lenses employing the same and methods for producing the same.

11 Claims, 8 Drawing Sheets

R and R' : polyurethane backbone

Urea Linkage

(51) Int. Cl.
*C08G 18/48* (2006.01)
*B32B 7/12* (2006.01)
*B32B 27/08* (2006.01)
*B32B 27/30* (2006.01)
*B32B 27/36* (2006.01)
*B32B 27/40* (2006.01)
*C08G 18/44* (2006.01)
*C08G 18/75* (2006.01)
*B29D 11/00* (2006.01)
*C08G 18/24* (2006.01)
*C08G 18/12* (2006.01)
*B32B 37/12* (2006.01)
*C08K 5/00* (2006.01)

(52) U.S. Cl.
CPC ............ *B32B 7/12* (2013.01); *B32B 27/08* (2013.01); *B32B 27/306* (2013.01); *B32B 27/36* (2013.01); *B32B 27/40* (2013.01); *B32B 37/1207* (2013.01); *C08G 18/12* (2013.01); *C08G 18/246* (2013.01); *C08G 18/4018* (2013.01); *C08G 18/44* (2013.01); *C08G 18/48* (2013.01); *C08G 18/4854* (2013.01); *C08G 18/758* (2013.01); *B29D 11/00644* (2013.01); *B29D 11/00865* (2013.01); *B32B 2307/412* (2013.01); *B32B 2307/42* (2013.01); *B32B 2329/04* (2013.01); *B32B 2367/00* (2013.01); *B32B 2375/00* (2013.01); *B32B 2551/00* (2013.01); *C08K 5/005* (2013.01); *C08K 5/0041* (2013.01); *C09J 2301/408* (2020.08)

(58) Field of Classification Search
CPC .............. C08K 5/005; B29D 11/00009; B29D 11/0073; B29D 11/00644; B29D 11/00865
USPC ...................................................... 428/423.1
See application file for complete search history.

(56) References Cited

U.S. PATENT DOCUMENTS

| | | |
|---|---|---|
| 6,797,383 B2 | 9/2004 | Nishizawa et al. |
| 9,440,419 B2 | 9/2016 | Vu et al. |
| 2002/0006505 A1* | 1/2002 | Nishizawa ............. B32B 27/08 428/220 |
| 2012/0004338 A1* | 1/2012 | Hywel-Evans .... C08G 18/4854 521/156 |
| 2012/0136124 A1 | 5/2012 | Carpentier et al. |
| 2013/0215488 A1 | 8/2013 | Hiraren et al. |
| 2014/0272426 A1* | 9/2014 | Vu ......................... C08G 18/44 428/423.3 |
| 2014/0340727 A1 | 11/2014 | Mori et al. |
| 2015/0083326 A1 | 3/2015 | Allen et al. |
| 2020/0283662 A1* | 9/2020 | Mori .................. C08G 18/2018 |

OTHER PUBLICATIONS

WIPO, U.S. International Search Authority, International Search Report and Written Opinion dated Dec. 27, 2018 in International Patent Application No. PCT/US2018/046374, 10 pages.

Japanese Patent Office, Office Action dated Aug. 2, 2022 with English translation in Japanese Patent Application No. 2020-530447, 7 pages.

\* cited by examiner

R and R' : polyurethane backbone

Urea Linkage

H: aromatic cyclic ring

OPTICAL ADHESIVE AND OPTICAL LAMINATES AND LENSES FORMED WITH SAME

RELATED APPLICATIONS

This application claims priority to U.S. Provisional Application Ser. No. 62/544,678 filed Aug. 11, 2017, entitled Optical Adhesive, which is hereby incorporated herein by reference in its entirety.

FIELD OF THE INVENTION

The present invention pertains to polyurethane-urea based optical adhesives for formation of optical film laminates, optically functional film laminates, and ophthalmic or eyeglass lenses employing the same and methods for producing the same.

BACKGROUND OF THE INVENTION

Plastic optical lenses are now common place in most ophthalmic lens or eyeglass markets. Many plastic optical lenses are formed of multiple plastic layers coupled to one another in order to impart different optical functional characteristics to the lens. For example, polarized lenses for eyeglasses are increasingly common and demanded in the marketplace. Polarized eyeglass lenses are typically produced by incorporating a polarizing film into the body of an eyeglass lens. The polarizing film can be incorporated into the lens alone or in the form of a film laminate or wafer structure. For example, a polarizing film laminate may be formed by laminating the polarizing film between two transparent protective resin films or sheets. The polarizing film or polarizing laminate is then incorporated into the body of the eyeglass lens either on an exterior surface, e.g. a front or back surface, of a lens body or is incorporated within the body of the eyeglass lens such that the polarizing film or polarizing laminate is interposed between two layers of the bulk lens material or substrate forming the lens.

U.S. Pat. No. 6,096,425 to Michael Barry Smith, Alcat Inc., the contents of which are herein incorporated in their entirety by reference, discloses a multilayer structure of a polarized laminate and methods of making the same. Thermoplastic polyurethane sheets were used to form the laminate and surface treatments in the form of etching and coating the substrate surface with a coupling agent were required for lamination. Lamination was performed in an autoclave using high heat and pressure in a process that is not suitable for a roll-to-roll coating or laminate production.

U.S. Pat. No. 6,797,383 to Nishizawa et al., Mitsubishi Gas Chemical Co. Inc, the contents of which are herein incorporated in their entirety by reference, discloses a multilayer synthetic resin laminate having both photochromic and polarization characteristics. A polyurethane containing aromatic isocyanate (diphenylmethane-4.4'-diisocyanate, MDI, and toluenediisocyanate TDI) was used to bond the layers of the laminate.

Unfortunately, existing optical lenses formed of multilayered laminate structures, including polarized lenses, often suffer from delamination under high humidity, high temperature and/or high stress conditions and/or employ laminates that require complicated surface treatment processes for formation. Such delamination failures adversely affect consumer perception and the sale of such specialty lenses in the marketplace. In the case of lenses employing polarized film laminates, the delamination often occurs at the interface of the surface of the polarizing film and the surface of the transparent protective layer. On the other hand, polarizing lenses that employ polarizing laminates that require complicated surface treatment processes for formation are disadvantageously more time consuming and costly to produce.

Hence, what is needed in the field is a more effective optical adhesive or optical adhesive system and more durable, stress tolerant, and cost-efficient optical film laminates employing the same that are relatively easy to produce and eyeglass lenses employing the same.

OBJECTS AND SUMMARY OF THE INVENTION

Certain embodiments of the present invention provide a more effective optical adhesive or optical adhesive system and more durable, stress tolerant, and cost-efficient optical film laminates employing the same that are relatively easy to produce and eyeglass lenses employing the same by providing an optical adhesive comprising: a crosslinked polyurethane-urea formed from a composition comprising: a reactive prepolymer composition formed of a mixture comprising at least two different polyols and an aliphatic isocyanate; a chain extender; and a crosslinking agent; the polyurethane-urea formed in-situ from reaction between isocyanate groups and water. Wherein the at least two different polyols comprises: a polycarbonate polyol having a Formula A:

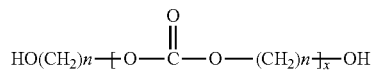

wherein "n" is equal to an integer from 3 to 6 or a combination thereof; "X" is an integer that makes the molecular weight of Formula A approximately equal to 500-2500 Daltons; and a polyether polyol having a Formula B:

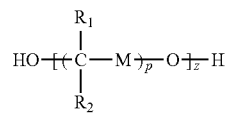

wherein "R1" and "R2" are hydrogen or an alkyl group; "p" is an integer from 1 to 3; "M" has a formula of $(CH_2)y$, wherein "y" is an integer from 1-5; and "z" is an integer that makes the molecular weight of Formula B approximately equal to 500-2500 Daltons; wherein the crosslinked polyurethane-urea is formed from a composition comprising a range of an equivalent ratio of isocyanate to water from 1.0 to 15.0; wherein the crosslinked polyurethane-urea is formed from a composition comprising by weight: 20-45 percent of one or more aliphatic isocyanate; 20-40 percent of one or more polycarbonate polyol; 20-40 percent of one or more polyether polyol; 0.2-5 percent of one or more chain extender; 0.05-8 percent of one or more crosslinking agent; and 0.1-1.2 percent of water; wherein the crosslinked polyurethane-urea is formed from a composition comprising an organic aprotic solvent; wherein the aliphatic isocyanate comprises 4,4'-dicyclohexylmethanediisocyanate; and wherein the crosslinking agent comprises multifunctional alcohols having not less than 3 alcohol functional groups or a multifunctional isocyanate having not less than three isocyanate functional groups.

In certain embodiments, the above-described advantages are achieved by providing a method for forming an optical adhesive comprising: forming an isocyanate-terminated prepolymer from a polycarbonate polyol and a polyether polyol; and forming a reaction composition by combining the isocyanate-terminated prepolymer with a chain extender, a crosslinking agent, and water. Wherein forming the isocyanate-terminated prepolymer from the polycarbonate polyol and the polyether polyol comprises forming the isocyanate-terminated prepolymer from a composition comprising: a polycarbonate polyol having a Formula A:

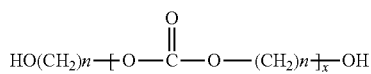

wherein "n" is equal to an integer from 3 to 6 or a combination thereof; "X" is an integer that makes the molecular weight of Formula A approximately equal to 500-2500 Daltons; and a polyether polyol having a Formula B:

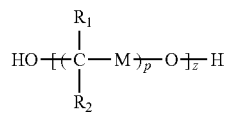

wherein "R1" and "R2" are hydrogen or an alkyl group; "p" is an integer from 1 to 3; "M" has a formula of $(CH_2)y$, wherein "y" is an integer from 1-5; and "z" is an integer that makes the molecular weight of Formula B approximately equal to 500-2500 Daltons; wherein forming the reaction composition by combining the isocyanate-terminated prepolymer with the chain extender, the crosslinking agent, and water comprises employing an equivalent ratio of isocyanate to water from 1.0 to 15.0; wherein forming the reaction composition by combining the isocyanate-terminated prepolymer with the chain extender, the crosslinking agent, and water further comprises admixing a photochromic dye to the reaction composition; and wherein forming the reaction composition by combining the isocyanate-terminated prepolymer with the chain extender, the crosslinking agent, and water further comprises admixing an additive selected from the group consisting of: static colorants, electrochromes, ultraviolet absorbers, blue light blockers, infrared light blockers, light stabilizers, and antioxidants.

In certain embodiments, the above-described advantages are achieved by providing an optically functional laminate comprising: a transparent film; an optically functional film; and a crosslinked polyurethane-urea adhesive adhering the transparent film to the optically functional film. Wherein the transparent film comprises polycarbonate; wherein the optically functional film comprises a polarizing film; wherein the optically functional film comprises polyvinyl alcohol; wherein the crosslinked polyurethane-urea adhesive is formed from a composition comprising: a reactive prepolymer composition formed of a mixture comprising at least two different polyols and an aliphatic isocyanate; a crosslinking agent; the polyurethane-urea formed in-situ from reaction between isocyanate groups and water; wherein the crosslinked polyurethane-urea adhesive is formed from a composition comprising: a polycarbonate polyol having a Formula A:

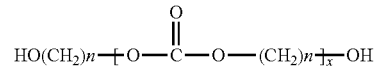

wherein "n" is equal to an integer from 3 to 6 or a combination thereof; "X" is an integer that makes the molecular weight of Formula A approximately equal to 500-2500 Daltons; and a polyether polyol having a Formula B:

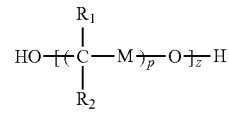

wherein "R1" and "R2" are hydrogen or an alkyl group; "p" is an integer from 1 to 3; "M" has a formula of $(CH_2)y$, wherein "y" is an integer from 1-5; and "z" is an integer that makes the molecular weight of Formula B approximately equal to 500-2500 Daltons; and wherein the crosslinked polyurethane-urea adhesive comprises a photochromic dye.

In certain embodiments, the above-described advantages are achieved by providing a method for forming an optical adhesive comprising: forming an isocyanate-terminated prepolymer from a composition comprising a polycarbonate polyol, a polyether polyol, and an aliphatic isocyanate; forming a hydroxyl-terminated prepolymer from a composition comprising a polycarbonate polyol, a polyether polyol, an aliphatic isocyanate, and water; and reacting the isocyanate-terminated prepolymer, hydroxy-terminated prepolymer, and a crosslinking agent with one another. Wherein forming an isocyanate-terminated prepolymer from a composition comprising a polycarbonate polyol, a polyether polyol, and an aliphatic isocyanate comprises forming the isocyanate-terminated prepolymer from a composition comprising: a polycarbonate polyol having a Formula A:

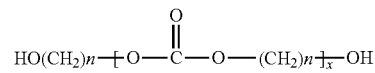

wherein "n" is equal to an integer from 3 to 6 or a combination thereof; "X" is an integer that makes the molecular weight of Formula A approximately equal to 500-2500 Daltons; and a polyether polyol having a Formula B:

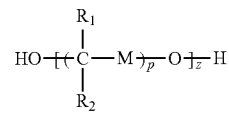

wherein "R1" and "R2" are hydrogen or an alkyl group; "p" is an integer from 1 to 3; "M" has a formula of $(CH_2)y$, wherein "y" is an integer from 1-5; and "z" is an integer that makes the molecular weight of Formula B approximately equal to 500-2500 Daltons; wherein forming a hydroxyl-terminated prepolymer from a composition comprising a polycarbonate polyol, a polyether polyol, an aliphatic isocyanate, and water comprises forming the hydroxyl-terminated prepolymer from a composition comprising: a polycarbonate polyol having a Formula A:

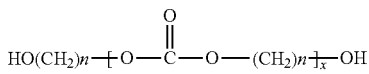

wherein "n" is equal to an integer from 3 to 6 or a combination thereof; "X" is an integer that makes the molecular weight of Formula A approximately equal to 500-2500 Daltons; and a polyether polyol having a Formula B:

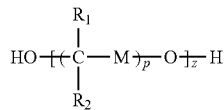

wherein "R1" and "R2" are hydrogen or an alkyl group; "p" is an integer from 1 to 3; "M" has a formula of $(CH_2)y$, wherein "y" is an integer from 1-5; and "z" is an integer that makes the molecular weight of Formula B approximately equal to 500-2500 Daltons; wherein forming a hydroxyl-terminated prepolymer from a composition comprising a polycarbonate polyol, a polyether polyol, an aliphatic isocyanate, and water comprising employing a range of an equivalent ratio of isocyanate to water from 1.0 to 15.0; wherein reacting the isocyanate-terminated prepolymer, hydroxy-terminated prepolymer, and a crosslinking agent with one another further comprises admixing a photochromic dye to the reaction composition; wherein; reacting the isocyanate-terminated prepolymer, hydroxy-terminated prepolymer, and a crosslinking agent with one another further comprises admixing an additive selected from the group consisting of: static colorants, electrochromes, ultraviolet absorbers, blue light blockers, infrared light blockers, light stabilizers, and antioxidants.

In certain embodiments, the above-described advantages are achieved by providing a method for forming an ophthalmic or eyeglass lens comprising: applying a layer of a crosslinked polyurethane-urea adhesive over an optical surface of a lens substrate; and adhering an optical film to the adhesive. Wherein the crosslinked polyurethane-urea adhesive is formed from a composition comprising: a reactive prepolymer composition formed of a mixture comprising at least two different polyols and an aliphatic isocyanate; a chain extender; a crosslinking agent; the polyurethane-urea formed in-situ from reaction between isocyanate groups and water; wherein the crosslinked polyurethane-urea adhesive is formed from a composition comprising: an isocyanate-terminated prepolymer formed from a composition comprising a polycarbonate polyol, a polyether polyol, and an aliphatic isocyanate; a hydroxyl-terminated prepolymer formed from a composition comprising a polycarbonate polyol, a polyether polyol, an aliphatic isocyanate, and water; the isocyanate-terminated prepolymer, the hydroxy-terminated prepolymer, and a crosslinking agent being reacted with one another; wherein the crosslinked polyurethane-urea adhesive is formed from a composition comprising: a polycarbonate polyol having a Formula A:

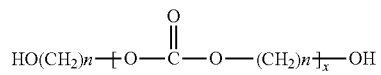

wherein "n" is equal to an integer from 3 to 6 or a combination thereof; "X" is an integer that makes the molecular weight of Formula A approximately equal to 500-2500 Daltons; and a polyether polyol having a Formula B:

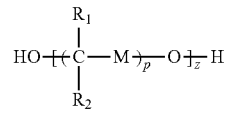

wherein "R1" and "R2" are hydrogen or an alkyl group; "p" is an integer from 1 to 3; "M" has a formula of $(CH_2)y$, wherein "y" is an integer from 1-5; and "z" is an integer that makes the molecular weight of Formula B approximately equal to 500-2500 Daltons; wherein the crosslinked polyurethane-urea adhesive comprises a photochromic dye; wherein the crosslinked polyurethane-urea is formed from a composition comprising a range of an equivalent ratio of isocyanate to water from 1.0 to 15.0; wherein the crosslinked polyurethane-urea is formed from a composition comprising by weight: 20-45 percent of one or more aliphatic isocyanate; 20-40 percent of one or more polycarbonate polyol; 20-40 percent of one or more polyether polyol; 0.2-5 percent of one or more chain extender; 0.05-8 percent of one or more crosslinking agent; and 0.1-1.2 percent of water; wherein the crosslinked polyurethane-urea is formed from a composition further comprising a photochromic dye; and wherein the crosslinked polyurethane-urea is formed from a composition further comprising an additive selected from the group consisting of: static colorants, electrochromes, ultraviolet absorbers, blue light blockers, infrared light blockers, light stabilizers, and antioxidants

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Figure 1A:
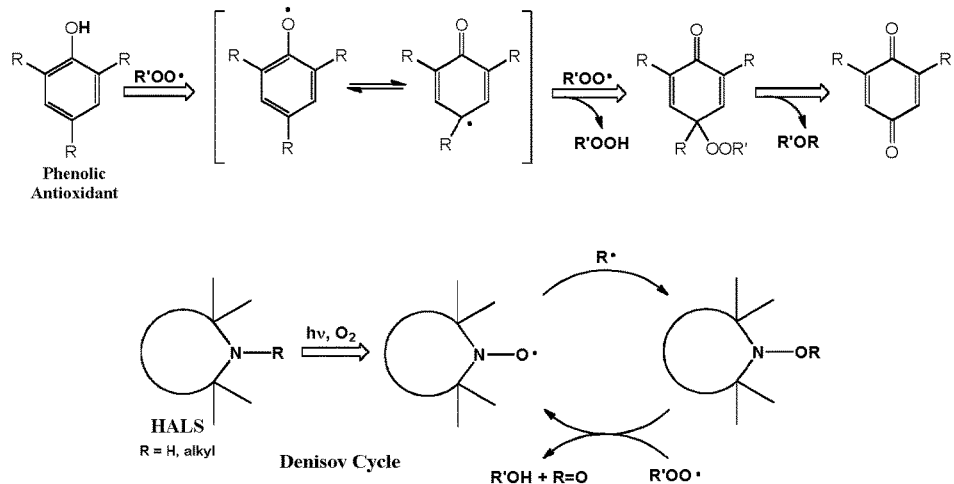
FIG. 1A is a partial schematic of a mode of action for certain stabilizer components that are optionally employed in the optical adhesive of the present invention.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

The terms "optical" and "optically" are herein used to denote of or relating to vision and/or suitable for vision therethrough. The term "film" is herein used to denote a single, thin monolithic layer of material typically having a thickness in the range of 5 to 1000 micrometers. As used herein, the term "film" is not limited by a method of formation thereof. The term "adhesive" is herein used to denote a substance that is used or employed to stick, bond, attach, or otherwise couple two or more things, e.g. films, to one another. The phrase "film laminate" is herein used to denote a structure formed of two or more films bonded, attached, or otherwise coupled to one another. Such bonding, attaching, or coupling may, but need not, be achieved through employing an adhesive. As used herein, the phrase "film laminate" is not limited by a method of formation thereof.

The present invention provides, in part, an improved optical adhesive for producing optical laminates and lenses. The inventive optical adhesive is a crosslinked polyurethane-urea that can be employed to form a wide range of optical articles such as optical film laminates and ophthalmic or eyeglass lenses.

In certain embodiments of the present invention, the optical adhesive is employed to bond, attach, or otherwise couple one or more optically functional films to one or more transparent films to form an optically functional laminate. The optically functional laminate is then incorporated into an eyeglass lens during formation of the lens, e.g. during molding of the lens, or the optical adhesive is further employed to bond, attach, or otherwise couple the optically functional laminate to an exterior surface of a lens. The transparent films functioning, in part, as a protective film or layer over the optically functional adhesive.

In certain embodiments of the present invention, the optical adhesive functions (1) as a carrier, a host, a matrix, or a composition into which other optically functional compounds are admixed so as to impart an optically functional attribute or characteristic to the adhesive and (2) as an adhesive to bond, attach, or otherwise couple two or more transparent films to one another or to bond, attach, or otherwise couple an optically functional film to one or more films to form an optically functional laminate. The optically functional laminate is then incorporated into an eyeglass lens during formation of the lens, e.g. during molding or casting of the lens, or the optical adhesive is further employed to bond, attach, or otherwise couple the optically functional laminate to an exterior surface of the lens.

Optical Adhesive Layer:

The optical adhesive of the present invention is a crosslinked polyurethane-urea system derived from a composition employing, in part, aliphatic isocyanates and polyols selected from polycarbonate polyols having a Formula A and polyether polyols having a Formula B:

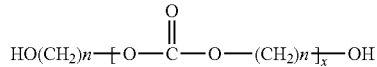

Formula A

Wherein "n" is equal to an integer from 3 to 6 or a combination thereof; "X" is an integer that makes the molecular weight of Formula A approximately equal to 500-2500 Daltons. By way of example, in certain embodiments of the present invention, the polycarbonate polyols are, for example, a polycarbonate diol available from UBE with commercial grades Eternacoll PH-100, Eternalcoll PH-200 and/or a polyalkylene carbonate diol such as DURANOL 5650, DURANOL 5652 and DURANOL™ G3450J available from Asahi Kasei Chemicals Corporation.

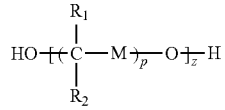

Formula B

Wherein "R1" and "R2" are hydrogen or an alkyl group; "p" is an integer from 1 to 3; "M" has a formula of $(CH_2)y$, wherein "y" is an integer from 1-5; and "z" is an integer that makes the molecular weight of Formula B approximately equal to 500-2500 Daltons. By way of example, in certain embodiments of the present invention, the polyether polyols are polyether diols available from TRISO as Carpenter Carpol PGP-1000, Carpenter Carpol PGP-2000 and/or polyether glycol available from INVISTA as TERATHANE® PTMEG, or from BASF as PolyTHF® 1000, PolyTHF® 2000, PolyTHF® 650.

The optical adhesive layer or layers of the present invention are, for example, formed of a composition comprising by weight: 20-45 percent of one or more aliphatic isocyanates; 20-40 percent of one or more polyols containing Formula A; 20-40 percent of one or more polyols containing Formula B; 1-5 percent of one or more stabilizers; 0.2-5 percent of one or more chain extenders; 0.05-8 percent of one or more crosslinking agents; and 0.1-1.2 percent of water, e.g. deionized water.

In certain embodiments, the composition is dissolved in one or more organic solvents prior to coating application. The organic solvent(s) is selected from, for example: aprotic solvents including, but not limited to, acetone; ethyl acetate; butyl acetate; methyl ethyl ketone (MEK); N,N-dimethylformamide (DMF); and tetrahydrofuran (THF).

In certain embodiments of the present invention, the aliphatic isocyanate(s) is selected from, for example: hexamethylene diisocyanate; isophorone diisocyanate; m-xylylene diisocyante; and 4,4'-dicyclohexylmethanediisocyanate (H12MDI, available from Bayer as Desmodur W).

In certain embodiments of the present invention, the chain extender(s) is selected from molecules or oligomers with the molecular weight not larger than 10,000 Daltons. Suitable chain extenders are bifunctional or trifunctional (trifunctional components being operable to act as both a chain extender and crosslinking agent). Chain extenders are, for example, either hydroxyl-terminated or isocyanate-terminated molecules or oligomers. Exemplary chain extenders include, but are not limited to, 1,6-hexandiol; 1,4-butanediol; 1,3-propanediol; hexamethylene diisocyanate; isophorone diisocyanate; and N,N',2-Tris(6-isocyanatohexyl) imidodicarbonic diamide (HDI biuret).

In certain embodiments of the present invention, the crosslinking agent(s) is selected from, for example, multifunctional alcohols having not less than 3 alcohol functional groups. The alcohol functional groups react with isocyanate groups in the isocyanate-terminated prepolymer to form the urethane linkage and hence the three-dimensional polymer molecule structure. Certain embodiments include, but are not limited to, trimethyolpropane, trimethylolmethane, glycerin, pentaerythritol and di(trimethylolpropane) (Di-TMP).

In certain embodiments of the present invention, the crosslinking agent(s) is selected from, for example, oligomers with more than two OH functional groups that can react with the isocyanate group in the isocyanate-terminated prepolymer. Certain embodiments include, but are not limited to, trimethylolpropane propoxylate with average MW=308 as supplied by Sigma Aldrich.

In certain embodiments of the present invention, the crosslinking agent(s) is selected from, for example, a solution that has molecules with total amino and OH groups not less than two wherein these groups react with isocyanate groups of the isocyanate-terminated prepolymer. Certain embodiments include, but are not limited to, N,N-Bis(2-hydroxyethyl)isopropanolamine and N,N,N',N'-Tetrakis(2-Hydroxypropyl)-ethylenediamine.

In certain embodiments of the present invention, the crosslinking agent(s) is selected from, for example, multifunctional isocyanates, isocyanate oligomers and isocyanate prepolymers, each having at least 3 NCO groups that react with the hydroxyl group of the prepolymer backbone to form new urethan bonds or to react with the —O—CO—NH— group of the hydroxyl-terminated prepolymer back bone to form allophanate bonds. Certain embodiments include, but are not limited to, Desmodur N75BA; Desmodur RFE; and Desmodur RE supplied by Bayer Materials and Irodur E310 supplied by Huntsman; and 24A-100, TPA-100 supplied by Asahi Kasei Chemical Corporation.

In certain embodiments of the present invention, the crosslinking agent(s) is selected from, for example, blocked isocyanates with not less than 3 isocyanate functional groups, those groups reacting with the hydroxyl groups of the prepolymer. When unblocked, mostly by elevated temperature, the isocyanate groups react with the hydroxyl groups of the prepolymer. Crosslinking agents with blocked isocyanates can be produced by reacting the multifunctional isocyanates with different blocking agents. Each blocking agent has a different de-blocking temperature, the temperature at which the dissociation reaction occurs that separates the blocking agent from the blocked isocyanate and provides the isocyanate functional group available for reaction.

Examples of blocking agents are the oxime agent such as 3,5-dimethyl pyrazole; 2,6-dimethyl-4-heptanone oxime; methyl ethyl ketoxime; 2-heptanone oxime; 1,2,4-triazole; ∈-caprolactam; and the alcohols such as nonylphenol, t-butanol, propylene glycol, isopropanol, methanol, n-butanol, n-propanol, n-hexanol, and n-pentanol. Examples of crosslinking agents with blocked isocyanate groups include the polyether aromatic based polyurethane prepolymer Impranil product line supplied by Bayer Coating such as Impranil HS-62, Impranil HS-130 or the commercially available Duranate 17B-60PX, Duranate TPA-B80X, Duranate E402-B80T, and Duranate MF-B60X manufactured by Asahi Kasei Chemicals Corporation.

In certain embodiments of the present invention, the crosslinking agent(s) is selected from, for example, heat-activated urea compounds with not less than two urea functional groups, wherein the urea functional groups react with isocyanate-terminated prepolymer at high temperature through biuret formation. Certain embodiments of such heat-activated ureas include, but are not limited to, 3,3'-hexamethylenebis(1,1'-dipropylurea) and 3,3'-(4-methyl-1,3-phenylene)bis(1,1'-dipropylurea).

In certain embodiments of the present invention, the crosslinking agent(s) is selected from, for example, (hydroxyalkyl)urea compounds with a single urea group and 2 hydroxyl groups, where the groups react with the isocyanate group of the isocyanate-terminated prepolymer. Certain embodiments include, but are not limited to, N,N-bis(2-hydroxyethyl)urea; tetrakis(2-hydroxylethyl)urea; tris(2-hydroxyethyl)urea; N,N'-bis(2-hydroxyethyl)urea; N,N'-bis(3-hydroxyethyl)urea; N,N'-bis(4-hydroxybutyl)urea; and 2-urea-2-ethyl-1,3-propanediol.

Figure 1B:
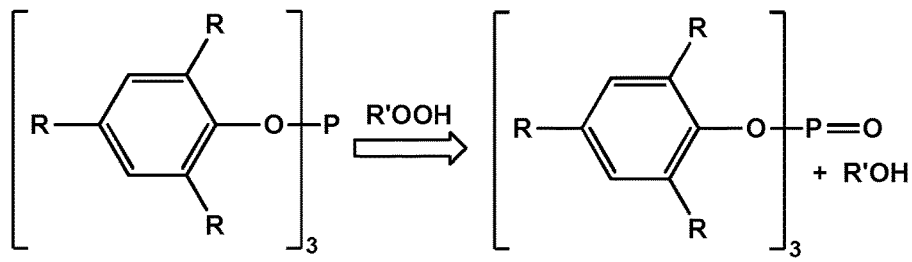
FIG. 1B is a partial schematic of a mode of action for certain stabilizer components that are optionally employed in the optical adhesive of the present invention.

In certain embodiments of the present invention, the optical adhesive optionally incorporates one or more additives, such as static or inactive colorants or dyes, photochromic dyes, electrochromic dyes, UV absorbers, blue light blockers, infrared light blockers, light stabilizers, and antioxidants. Light stabilizers, synergistic with phenolic (primary) antioxidants, contribute to destruction of damaging free radicals, which can be generated from adhesive components on exposure to UV light in the presence of oxygen. More specifically, these materials, generically known as HALS (hindered amine light stabilizers), work together with the primary antioxidants to destroy peroxide radicals through the Denisov Cycle as shown in FIG. 1A. Further stabilization is possible through the destruction of hydroperoxides by secondary phosphite antioxidants, as shown in FIG. 1B.

Figure 2:
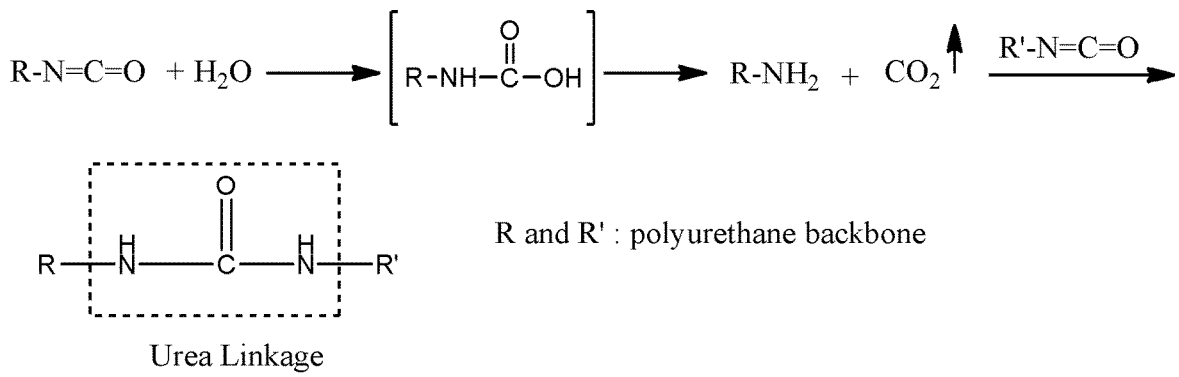
FIG. 2 is a partial schematic of a method for making an optical adhesive according to certain embodiments of the present invention.

With reference to FIG. 2, the inventive polyurethane-urea adhesive system is generated, in part, by the in-situ reaction between isocyanate and water, e.g. deionized water. In certain embodiments, a range of the equivalent ratio of isocyanate to water is from 1.0 to 15.0.

In certain embodiments, the present invention further provides a method for producing the inventive optical adhesive. The composition from which the optical adhesive is formed is prepared by first preparing one or more isocyanate-terminated prepolymers by reacting one or more polyols with one or more aliphatic isocyanates in one or more organic solvents. The prepolymer composition is then reacted with a composition employing one or more additives, one or more chain extenders, one or more crosslinking agents, one or more solvents, and water.

In certain embodiments, the present invention provides another method for producing the inventive optical adhesive in which the composition from which the optical adhesive is formed is prepared by first preparing one or more isocyanate-terminated prepolymers by reacting one or more polyols with one or more aliphatic isocyanates in one or more organic solvents. Next, one or more hydroxy-terminated prepolymers are prepared by reacting one or more polyols with one or more aliphatic isocyanates in one or more organic solvents followed by the addition of water. The hydroxy-terminated prepolymers are then combined with the one or more isocyanate-terminated prepolymers, one or more additives, one or more crosslinking agents, and one or more solvents.

Multiple isocyanate-terminated prepolymers and hydroxyl-terminated prepolymers can be employed and may be formed either in a single reaction mixture or in independent reaction mixtures and later combined in to a single composition.

Without being limited by theory, the water reacts with isocyanate to generate amino functional groups in-situ which further react with excess isocyanate to form polyurethane-urea linkages in the backbone of the polymer. Since the reaction between water and isocyanate can also produce carbon dioxide, a degassing procedure is usually required to release carbon dioxide before application or coating of the optical adhesive.

Polyurethane-urea systems generated by the in-situ methods described in this invention advantageously do not cause haziness after coating. Furthermore, polyurethane-urea systems generated by the in-situ methods described in this invention advantageously continue reaction and, hence, formation of polyurethane-urea linkages until the termination of the reaction by curing, e.g. until curing of the inventive adhesive after formation of an optical article such as a film laminate or ophthalmic or eyeglass lens.

Formation of Optically Functional Film Laminates

Figure 3:
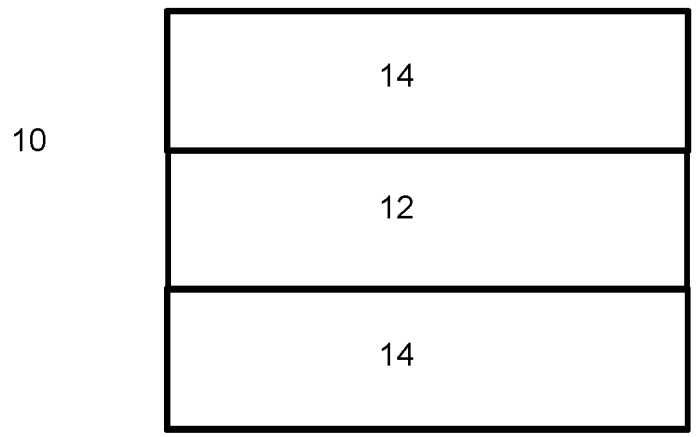
FIG. 3 is a partial cross-sectional view of an optical laminate according to certain embodiments of the present invention.

In one embodiment of the present invention, as shown in FIG. 3, an optical film laminate 10 employs an optical adhesive 12 to bond, attach, or otherwise couple two transparent films 14 to one another. The two transparent films 14 are formed of the same or different types of materials relative to one another.

The transparent film or films employed in the present invention are formed, for example, of polycarbonate, polysulfone, cellulose acetate butyrate (CAB), polyacrylate, polymathacrylate (PMMA), polyester, polystyrene, copolymers of acrylate and styrene or combinations thereof. In certain embodiments, the transparent films employed have a retardation value greater than 4000 nanometers or smaller than 200 nanometer and a thickness of 40 micrometers or greater.

In another embodiment of the present invention, the inventive optical adhesive is employed to bond optically functional films with transparent films to form optically functional film laminates. The phrase "optically functional film" is herein used to denote a film that imparts one or more optically functional attributes to an article in or on which the optically functional film is employed, e.g. a film laminate or an ophthalmic or eyeglass lens. The phrase "optically functional film laminate" is herein used to denote a film laminate employing one or more optically functional films and/or optically functional adhesives (described further below) that impart one or more optically functional attributes to an article in or on which the optically functional film laminate is employed, e.g. an ophthalmic or eyeglass lens. The phrase "optically functional attribute" is herein used to denote vision related and/or visual attributes included, but not limited to. static or dynamic coloration, polarization, selective reflection and/or absorption of wavelengths of light, anti-reflection, anti-fogging, anti-static, and/or easy cleaning.

For example, in the present embodiment, the inventive optical adhesive is employed to bond PVA polarizing film; to bond PET polarizing film; to bond mesogen coated films; to bond patterned films; to bond films of wire grid polarizers; and to bond films employing electrically active structures to form optically functional laminates.

Figure 4:
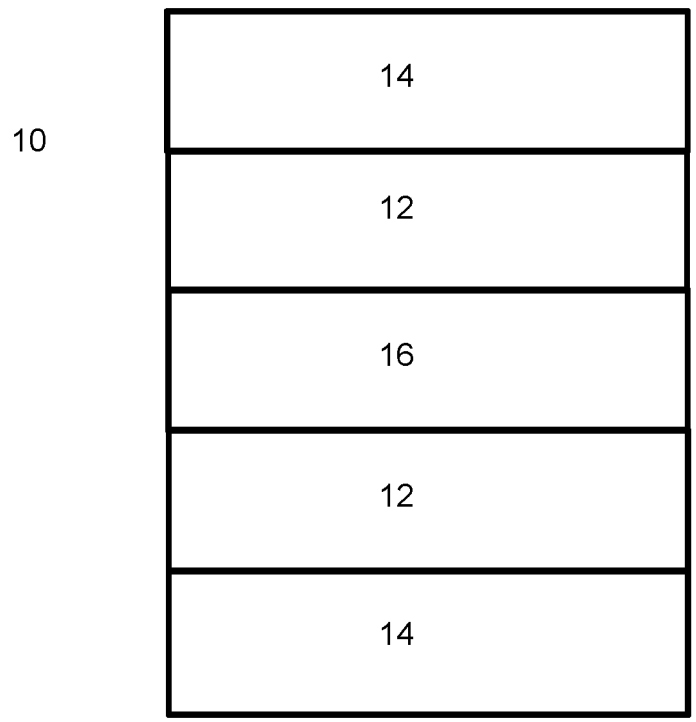
FIG. 4 is a partial cross-sectional view of an optically functional laminate according to certain embodiments of the present invention.

In one embodiment of the present invention, as shown in FIG. 4, an optically functional film laminate 10 employs an optical adhesive 12 to bond, attach, or otherwise couple one or more optically functional films 16 between two or more transparent films 14. The two or more transparent films 14 and the optically functional film(s) 16 are formed of the same or different types of materials relative to one another.

Figure 5:
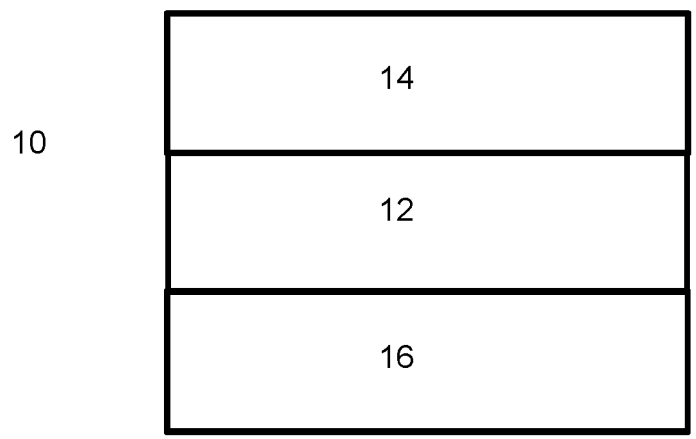
FIG. 5 is a partial cross-sectional view of an optically functional laminate according to certain embodiments of the present invention.

In another embodiment of the present invention, as shown in FIG. 5, the optically functional film laminate 10 employs the optical adhesive 12 to bond, attach, or otherwise couple one optically functional film 16 to one transparent film 14. The transparent film 14 and the functional film 16 are formed of the same or different types of materials relative to one another.

Figure 6:
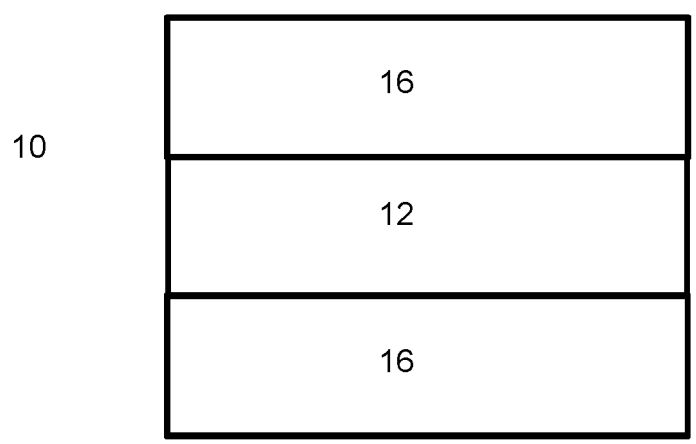
FIG. 6 is a partial cross-sectional view of an optically functional laminate according to certain embodiments of the present invention.

In certain embodiments, as shown in FIG. 6, the optically functional film laminate 10 employs the inventive optical adhesive 12 to bond, attach, or otherwise couple two or more optically functional films 16 to one another, i.e. the optically functional laminate 10 need not employ one of more transparent films 14.

In certain embodiments, the optically functional film is a polarizer comprising a polyvinyl alcohol (PVA) or polyethylene terephthalate (PET) film with polarizing efficiency not less than 80%. Examples of different colors of polarized PVA laminates are provided below in Table 1.

TABLE 1

Example Polarizers

| Examples | Polarized Laminate Colors | a* | b* | Luminous Transmittance, % | Polarized efficiency |
| --- | --- | --- | --- | --- | --- |
| 1 | Grey Type A | −2.3 | 2.1 | 17.6 | 99% |
| 2 | Brown Type A | 9.7 | 36.2 | 12.5 | 99% |
| 3 | Grey Type B | 2.7 | 7.6 | 10.8 | 99% |
| 4 | Brown Type B | 9.1 | 38.1 | 18.4 | 97% |
| 5 | Green Type A | −7 | 7.9 | 16.5 | 99% |
| 6 | Grey Type C | −3.6 | −1.0 | 40.0 | 99% |
| 7 | Blue Type A | −2 | −12.4 | 13.4 | 99% |
| 8 | Green Type B | −7 | 16 | 10.5 | 99% |

In certain embodiments, the optically functional film employs a wire grid polarizer(s) formed thereupon or therein. Exemplary details of optically functional films and film laminates employing wire grid polarizers are provided in the Assignee's U.S. application Ser. No. 14/616,578, the contents of which are herein incorporated in their entirety by reference.

In certain embodiments, the optically functional film employs one or more coatings with a mesogenic/liquid crystal structure thereupon or therein.

In certain embodiments, the optically functional film employs one or more patterns formed thereupon or therein. Exemplary details of optically functional films and film laminates employing wire grid polarizers are provided in the Assignee's U.S. application Ser. No. 14/616,578, the contents of which are herein incorporated in their entirety by reference.

In certain embodiments, the optically functional film employs one or more electrically active structures thereupon or therein.

In certain embodiments of the present invention, the optical adhesive functions (1) as an adhesive to bond, attach, or otherwise couple films or substrates to one another and (2) as a carrier and/or a host matrix in which other molecules, compounds, particles, dispersed phases, and/or components are admixed so as to impart optically functional attributes to the adhesive and, likewise, to the laminate and/or ophthalmic or eyeglass lens in which the optically functional adhesive is employed. The phrase "optically functional adhesive" is herein used to denote the optical adhesive of the present invention that imparts one or more optically functional attributes to an article in or on which the optically functional adhesive is employed, e.g. a film laminate and/or an ophthalmic or eyeglass lens. For example, in certain embodiments, the optically functional adhesive functions as a carrier or host for colorants, photochromic dyes; thermochromic dyes; electrochromic dyes, ultraviolet (UV) light absorbers; blue light absorbers; and/or infrared (IR) absorbers or particles comprising the same and combinations thereof.

Figure 7:
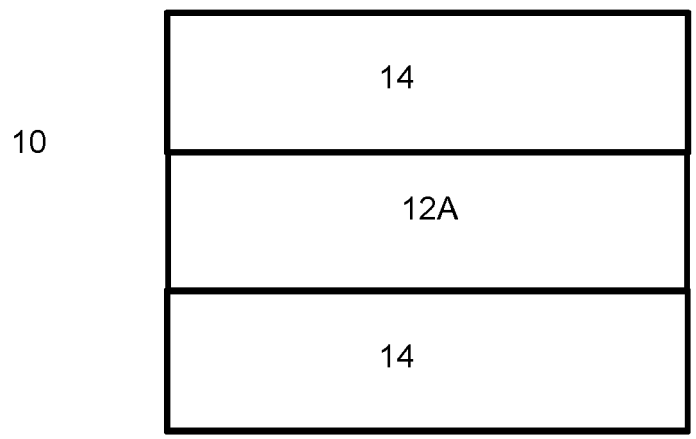
FIG. 7 is a partial cross-sectional view of an optically functional laminate according to certain embodiments of the present invention.

In one embodiment of the present invention, as shown in FIG. 7, an optically functional film laminate 10 employs an optically functional adhesive 12A to bond, attach, or otherwise couple two or more transparent films 14. The two or more transparent films 14 are formed of the same or different types of materials relative to one another.

In certain embodiments of the present invention, the optically functional adhesive employs permanent or dynamic colorants or dyes. Permanent colorants include traditional dyes and pigments, including metameric and magnetic pigments, which can change color or alignment under different lighting or magnetic environments. Permanent colorants are generally soluble dyes but may also be pigments having relatively small particle size, for example, less than 10 nanometers.

Dynamic colorants may, for example, be any suitable photochromic compounds. For example, organic compounds that, when molecularly dispersed, as in a solution state, are activated (darken) when exposed to a certain light energy (e.g., outdoor sunlight), and bleach to clear when the light energy is removed. Such can be selected from benzopyrans, naphthopyrans, spirobenzopyrans, spironaphthopyrans, spirobenzoxines, spironaphthoxazines, fulgides and fulgimides. Such Dynamic colorants compounds have been reported, for example, in U.S. Pat. Nos. 5,658,502, 5,702, 645, 5,840,926, 6,096,246, 6,113,812, and 6,296,785; and U.S. application Ser. No. 10/038,350, all commonly assigned to the same assignee as the present invention and all incorporated herein by reference.

Among the photochromic compounds identified, naphthopyran derivatives exhibit good quantum efficiency for coloring, a good sensitivity and saturated optical density, an acceptable bleach or fade rate, and, most importantly, good fatigue behavior for use in eyewear. These compounds are available to cover the visible light spectrum from 400 nanometer to 700 nanometer. Thus, it is possible to obtain a desired blended color, such as neutral gray or brown, by mixing two or more photochromic compounds having complementary colors under an activated state.

In certain embodiments, the use of variously colored dyes in specific microenvironments which alter the color of the dyes so as to produce neutral grey colors when activated by virtue of the small a* and b* values observed in the specific microenvironments is achieved.

Suitable dyes include naphtho[2,1b]pyrans and naphtho [1,2b]pyrans represented by the following generic formula:

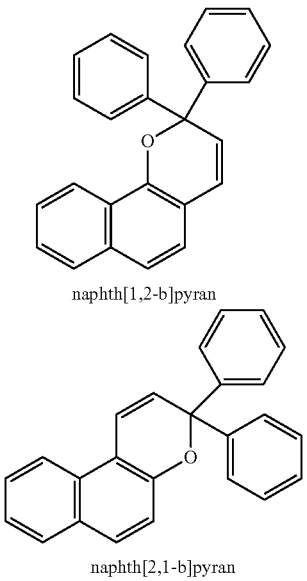

naphth[1,2-b]pyran naphth[2,1-b]pyran

In certain embodiments of the present invention, the colorants include one or more photochromic dyes and optionally, one or more permanent dyes and/or pigments. In certain embodiments, the colorants only include permanent dyes and/or pigments.

In certain embodiments, the optically functional adhesive employs particles, dispersed phases, and/or components in which permanent or dynamic colorants or dyes are contained and otherwise isolated or substantially isolated from the composition of the inventive adhesive. In certain embodiments, such particles and/or dispersed phases employ one or more additives chosen to independently control and modify the color of permanent or dynamic colorants or dyes and/or the activation and fading response of one or more dynamic dyes, and/or one or more dye modifiers. Additional details relating to such particles and dispersed phases can be found in the Assignee's U.S. application Ser. No. 14/751,043, the contents of which are herein incorporated in their entirety by reference.

Figure 8:
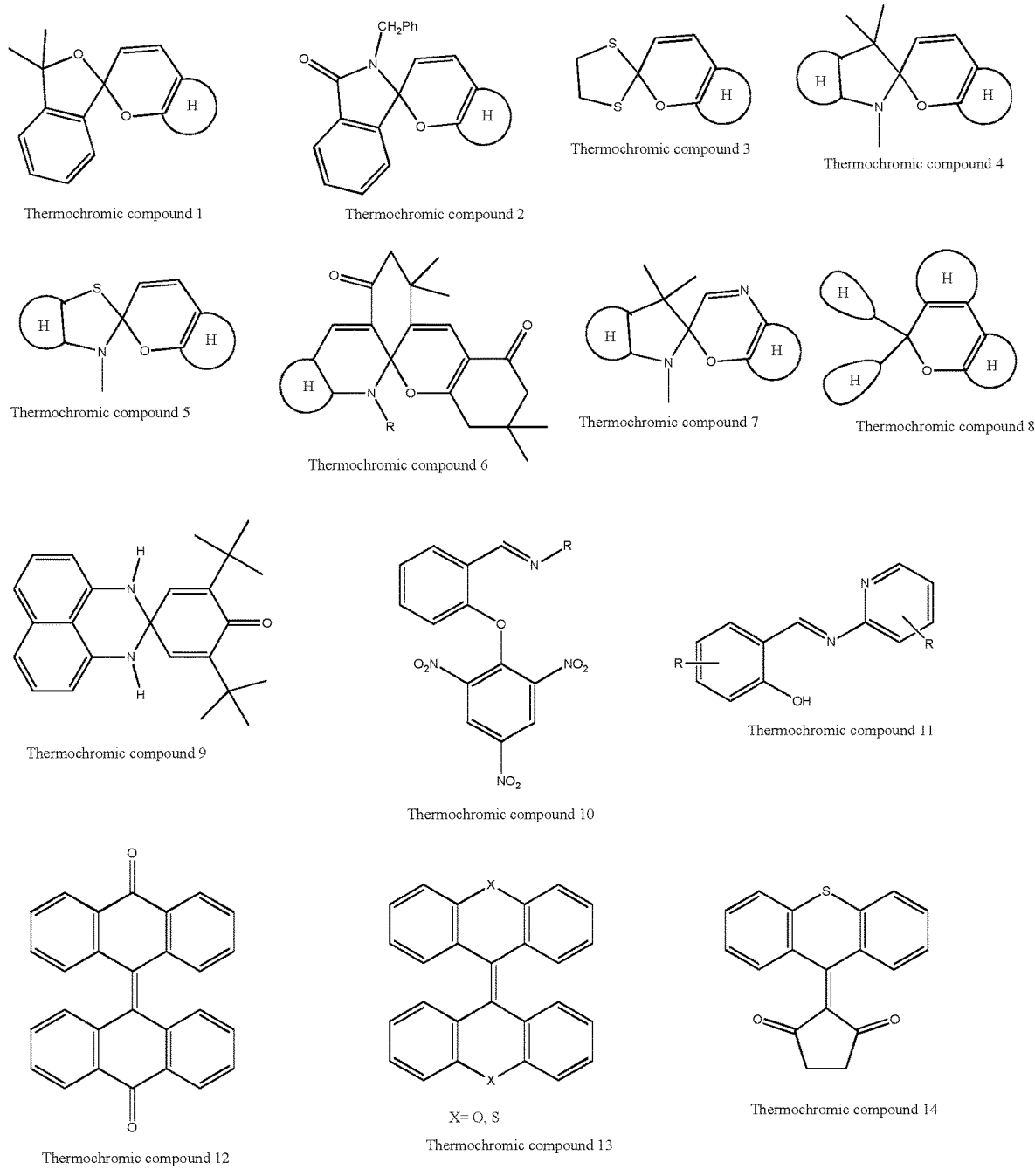
FIG. 8 shows exemplary thermochromic dyes that are optionally employed in the optical adhesive of the present invention.

In certain embodiments of the present invention, the optically functional adhesive employs thermochromic dyes which involve reversible color changes with the variation of temperature. Suitable thermochromic dyes include the derivatives of spiropyrans, spirooxazines, [2H]-pyrans, spirocyclohexadienones, Schiff base, cholesteryl oleyl carbonate and some steric hindered substituted ethenes, examples of which are presented as the generic formulae in FIG. 8.

In certain embodiments of the present invention, the optically functional adhesive employs electrochromic systems comprising electrochromes. Exemplary electrochromes may include, but are not limited to, Viologens (1,1'-disubstituted-4,4'-bipyridilium ions compounds); antimony doped tin oxide (ATO); Tungsten Trioxide (WO3); polyanilines; polythiophenes; poly(3,4-ethylene-dioxypyrrole) (PEDOP); and Fullerene C60 thin films.

In certain embodiments of the present invention, the optically functional adhesive employs ultraviolet (UV) light absorbers. Compounds useful in protection against harmful ultraviolet and blue (HEV, high energy visible) radiation strongly absorb light in these wavelengths and may contain one or more structural features with extended $\pi$-electron clouds, more accurately described as compounds with formal unsaturation or multiple bonds between individual adjacent atoms alternately separated by single bonds between adjacent atoms. Generic structures meeting this broad description generally contain so-called aromatic groups, the parent structure being represented by benzene. Other arrays of atoms can serve as the basis for their structures, including extended linear or cyclic arrays of alternating carbon to carbon double and single bonds, particularly where one or more carbon atoms is replaced by a heteroatom such as nitrogen, oxygen or sulphur. The wavelengths absorbed by these structures can be tuned by the number, type, and arrangement of the constituent atoms, including adjoined (fused) rings and the presence of substituent heteroatoms not involved in the extended system of multiple bonds, which atoms possess unshared (lone or non-bonding) pairs of electrons. Such heteroatoms include but are not limited to nitrogen, oxygen and sulfur, and halogens, particularly chlorine.

Figure 9A:
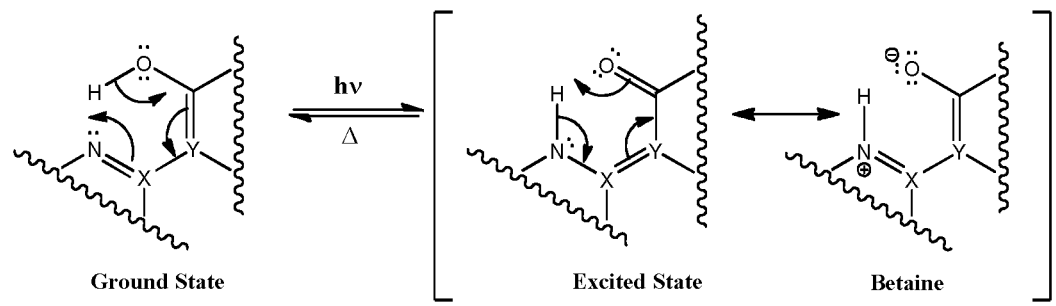
FIG. 9A is a partial schematic of a mode of action for an exemplary light absorber that is optionally employed in the optical adhesive of the present invention.

Certain structures for UV and HEV absorption have a mechanism whereby they can harmlessly "dump" the energy they absorb from the incident light by a reversible transformation of the electronic excited state (formed by light absorption) as heat through atomic motion, more correctly, through transfer of a neutral hydrogen atom (H) or a proton (H+), from one bonding partner to another, for example between oxygen and nitrogen appropriately arrayed in space, by a process known as tautomerization, a formal rearrangement of atoms and electrons through shifting of single and double bonds. An example of such tautomerization is shown in FIG. 9A. In the example shown in FIG. 9A, the hydrogen atom transfers from the oxygen atom in the ground state to the neighboring nitrogen atom in the excited state, accompanied by a shift of $\pi$-electrons, and back again with liberation of heat and resulting in no net structural change. Such hydrogen atom transfers or migrations are thought to occur because of increased acidity of the group containing the hydrogen atom in the excited state, such that the basicity of the neighboring heteroatom is strong enough to abstract the hydrogen atom or proton to form a new neutral structure, which may also be represented as one in which there are neighboring opposite charges in the structure, also called a betaine.

Figure 9B:
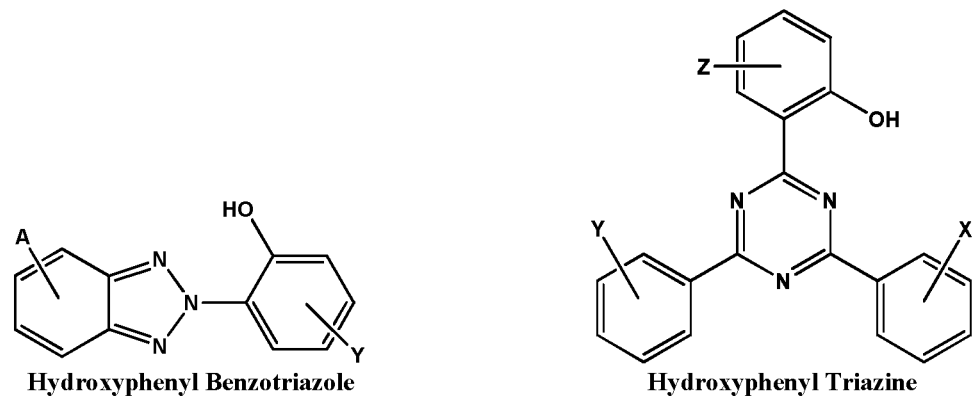
FIG. 9B are exemplary structures of light absorbers that is optionally employed in the optical adhesive of the present invention.

With reference to FIG. 9B, generic class examples are represented by hydroxyphenyl benzotriazoles, where A is typically an electron withdrawing group and Y is typically 1 or more hydrocarbon structures chosen for increased solubility and hydroxyphenyl triazines where X and Y are typically H, an aromatic ring or an electron withdrawing group and Z is a hydrocarbon group to improve solubility.

Figure 9C:
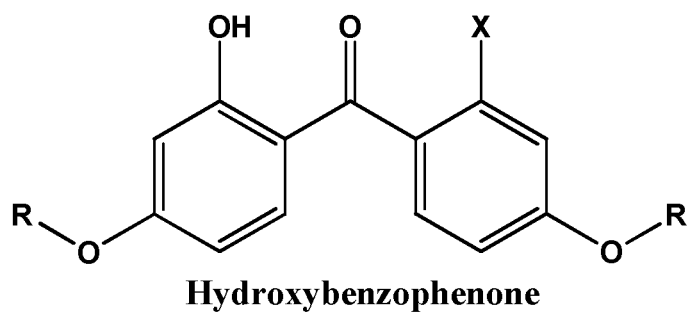
FIG. 9C is an exemplary structure of light absorber that is optionally employed in the optical adhesive of the present invention.

With reference to FIG. 9C, in certain structures, the hydrogen atom transfers in the opposite sense from a nitrogen atom in the ground state to an oxygen atom in the excited state or between two appropriately positioned oxygen or nitrogen atoms, such as illustrated by hydroxybenzophenones where X is typically H or OH and R is typically an alkyl group.

In certain embodiments, combinations of UV light absorbers from the first class of materials described above, i.e. materials subject to tautomerization in which a hydrogen atom transfers from an oxygen atom in a ground state to a neighboring nitrogen atom in an excited state, can be employed. For example, compounds which function by the hydrogen atom transfer mechanism include hydroxyphenyl benzotriazoles, exemplified by 2-(3'-tert-butyl-2'-hydroxy-5'-methylphenyl)-5-chlorobenzotriazole (CAS #: 3896-11-5), available commercially as Tinuvin 326 or Omnistab 326; or pyrrolo[3,4-f]benzotriazole-5,7(2H,6H)-dione, 6-butyl-2-[2-hydroxy-3-(1-methyl-1-phenylethyl)-5-(1,1,3,3-tetramethylbutyl)phenyl]-(CAS #945857-19-2) available commercially as Tinuvin CarboProtect; hydroxyphenyl triazines exemplified by 2-(4,6-diphenyl-1,3,5-triazin-2-yl)-5-[(hexyl)oxy]-phenol, (CAS #147315-50-2) available commercially as Tinuvin 1577; or the mixture of 2-[4-[2-hydroxy-3-tridecyl (and dodecyl) oxypropyl]oxy]-2-hydroxyphenyl]-4,6-bis(2,4-dimethylphenyl)-1,3,5-triazine (CAS #153519-44-9) available commercially as Tinuvin 400; and hydroxybenzophenones exemplified by 2-hydroxy-4-octyloxybenzophenone (CAS #1843-05-6) available commercially as Uvinul 3008; or 2,2'-dihydroxy-4,4'-dimethoxy benzophenone (CAS #131-54-4) available commercially as Uvinul D49 and Cyasorb UV.

Figure 9D:
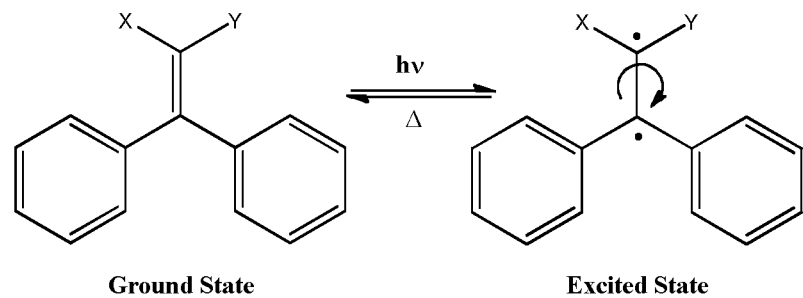
FIG. 9D is a partial schematic of a mode of action for an exemplary light absorber that is optionally employed in the optical adhesive of the present invention.

With reference to FIG. 9D, other structures are known where the likely UV to thermal energy conversion is accomplished by breaking of a carbon to carbon double bond to form two adjacent stabilized radicals where X and Y are electron withdrawing groups, allowing "free" rotation of the newly generated single bond between these two adjacent free radical centers, with ultimate reformation of the double bond, with no net change to the molecular structure.

In certain embodiments, UV light absorbers of the second class of materials described above, i.e. materials subject to the breaking of a double bond to form two adjacent stabilized radicals, are employed in combination. Two principle examples of materials of this second class, known as diaryl cyanoacrylates, include ethyl-2-cyano-3,3-diphenylacrylate (CAS #5232-99-5) commercially available as Uvinul 3035; and 1,3-bis-[(2'-cyano-3',3'-di phenylacryloyl)oxy]-2,2-bis-{[(2'-cyano-3',3'-diphenylacryloyl)oxy]methyl}-propane (CAS #178671-58-4) commercially available as Uvinul 3030. This second class of materials tends to absorb shorter wavelength (higher energy) light than the first class of hydrogen atom transfer light absorbers.

Such materials as described can be used separately or in combination with an array of different substituents around the structure, which substituents are selected on the basis of their ability to modify the wavelengths of light absorbed, the stability of the excited state intermediates, and their effects on the solubility or compatibility of the resultant ground state structures in or with the media in which they are dissolved. There is a wide range of commercially available compounds possessing these key reversible structural characteristics, sold as stabilizing additives.

In certain embodiments of the present invention, the optically functional adhesive employs blue light absorbers.

The examples of blue light absorbers include UV381A, UV381B, UV386A, VIS404A, VIS423A supplied by QCR Solutions Corp; SDA4030, SDA4040, SDB7040, SDA6978, MSA4847 supplied by H.W. Sands Corp.

In certain embodiments of the present invention, the optically functional adhesive employs infrared (IR) absorbers. The examples of infrared absorbers are LUM800, LUM810, LUM860, LUM995 supplied by MOLECULUM.

Figure 10:
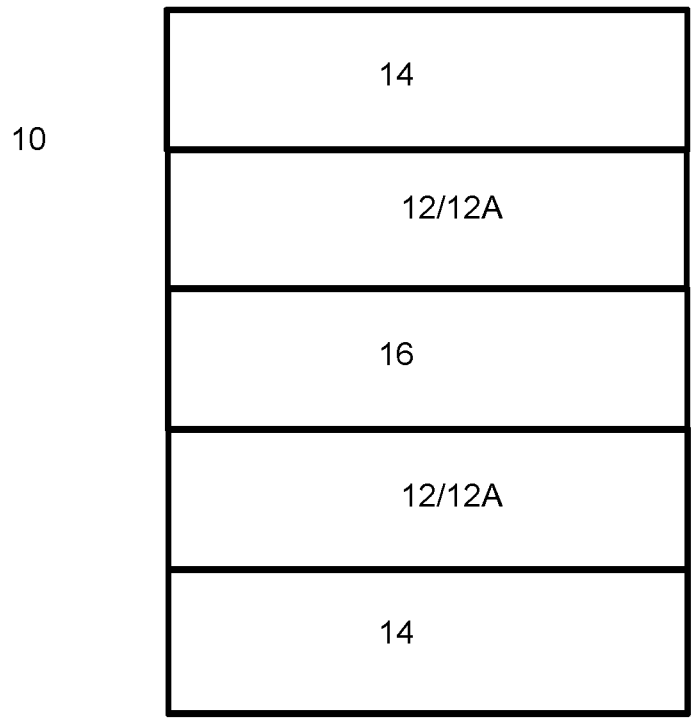
FIG. 10 is a partial cross-sectional view of an optically functional laminate according to certain embodiments of the present invention.

In certain embodiments of the present invention, any combination of the above-described optical adhesive or optically functional adhesive, optically functional films, and/or transparent films, are employed to form an optically functional laminate. For example, in one embodiment, the optically functional adhesive is employed as a carrier and/or host matrix for functional components of optical lenses, for example, as a host or carrier of photochromic dyes; thermochromics dyes; electrochromes, UV absorbers; blue light absorbers; and IR absorbers and to bond, attach, or otherwise couple an optically functional film between two or more transparent films. For example, as shown in FIG. 10, an optically functional film laminate 10 employs an optical adhesive 12 and/or an optical adhesive 12A to bond, attach, or otherwise couple an optically functional film 16 between two or more transparent films 14. The two or more transparent films 14 and the interposed optically functional film 16 are formed of the same or different types of materials relative to one another.

Figure 11:
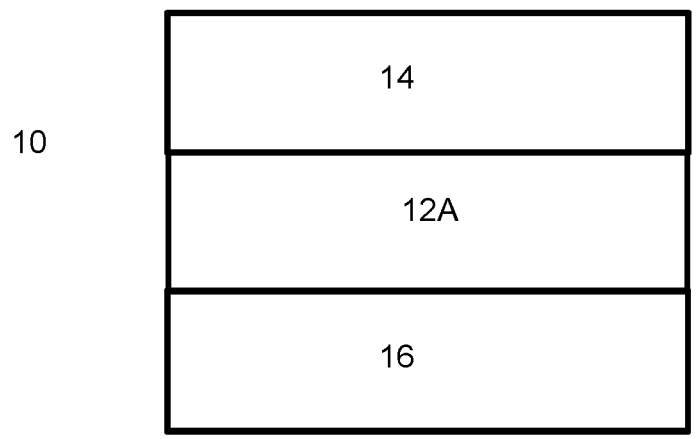
FIG. 11 is a partial cross-sectional view of an optically functional laminate according to certain embodiments of the present invention.

In certain embodiments of the present invention, as shown in FIG. 11, the optically functional film laminate 10 employs the optically functional adhesive 12A to bond, attach, or otherwise couple one optically functional film 16 to one transparent film 14. The transparent film 14 and the optically functional film 16 are formed of the same or different types of materials relative to one another.

In certain embodiments, the present invention provides a polarizer laminate having photochromic characteristics.

In certain embodiments, the present invention provides a polarizer laminate having UV blocking characteristics.

In certain embodiments, the present invention provides a polarizer laminate having blue light blocking characteristics.

In certain embodiments, the present invention provides a polarizer laminate having UV and blue light blocking characteristics.

In certain embodiments, the present invention provides a polarizer laminate having photochromic and UV blocking characteristics.

In certain embodiments, the present invention provides a polarizer laminate having photochromic and blue light blocking characteristics.

In certain embodiments, the present invention provides a polarizer laminate having photochromic, UV and blue light blocking characteristics.

In certain embodiments, the present invention provides a polarizer laminate having near infrared (IR) radiation absorbing characteristics.

Optically functional laminates according to the present invention may further employ additional functional properties imparted by additional coatings and treatments applied. For example, the inventive laminates may employ anti-reflective coatings, hard coatings, hydrophobic or hydrophilic coatings, anti-fouling or easy cleaning layers or coatings, and anti-fogging coatings.

Direct Coating and Laminating Method:

In certain embodiments of the present invention, the inventive optical or optically functional adhesive is employed to form optical and optically functional laminates through direct coating and lamination methods. The optical or optically functional adhesive is first coated on one surface of a film, e.g. a transparent or optically functional film. The solvent of the optical or optically functional adhesive is then removed by heating the optical or optically functional adhesive coated film in an oven at a temperature in a range of 65-140 degrees Celsius. The optical or optically functional adhesive coated film is then laminated to a first surface of a second film, e.g. a transparent or optically functional film. In the case of a three or more-film layer laminate, the optical or optically functional adhesive is also coated on to surface of a third film e.g. a transparent or optically functional film, and the solvent of the optical or optically functional adhesive is removed by heating the optical or optically functional adhesive coated third film or substrate in an oven at a temperature in a range of 65-140 degrees Celsius. The optical or optically functional adhesive coated third film or substrate is then laminated to a second surface of the second film. The formed optically functional laminate is then cured at elevated temperature. In certain embodiments of the invention, curing includes exposing the laminate from 30 degrees Celsius to 110 degrees Celsius, for one hour to one week. In one embodiment, the conditions for curing the laminate are 50 to 90 degrees Celsius for eight hours to five days.

Release Liner Transfer Coating Method:

In certain embodiments of the present invention, the inventive optical or optically functional adhesive is employed to form optically functional laminates through a release liner transfer coating and lamination method. The optical or optically functional adhesive is first coated on to a release liner. The solvent of the optical or optically functional adhesive is then removed by heating the optical or optically functional adhesive coated release liner in an oven at a temperature in a range of 65-140 degrees Celsius. The optical or optically functional adhesive coating of the release liner is then transferred to a surface of a first film or substrate e.g. a transparent or optically functional film. The optical or optically functional adhesive coated first film is then laminated to a first surface of a second film, e.g. a transparent or optically functional film. In the case of a three or more-film layer laminate, the optical or optically functional adhesive is then also coated on to a second release liner and the solvent of the optical or optically functional adhesive is removed by heating the adhesive coated release liner in an oven at a temperature in a range of 65-140 degrees Celsius. The optical or optically functional adhesive coated second release liner is then transferred to a surface of a third film or substrate e.g. a transparent or optically functional film. The optical or optically functional adhesive coated third film or substrate is then laminated to a second surface of the second film. The formed optically functional laminate is then cured at elevated temperature. In certain embodiments of the invention, curing includes exposing the laminate from 30 degrees Celsius to 110 degrees Celsius, for one hour to one week. In one embodiment, the conditions for curing the laminate are 50 to 90 degrees Celsius for eight hours to five days.

In certain embodiments of the present invention, the optically functional laminate is produced by roll-to-roll coating methods. The optical or optically functional adhesive application is achieved by common methods such as meniscus slot die, flow coating, roll coating and Meyer rod. The web coated optical or optically functional adhesive solution is dried in an oven such as a conveyor oven and then laminated to a film, e.g. a transparent or optically functional film. After rewinding the formed laminate can be sheeted into flat sections which can then be cured as described above.

The present invention provides an optically functional laminate, e.g. a polarizing film laminate, with excellent delamination resistant properties and a facile laminate process without additional surface treatment or primer. The composition of the inventive adhesive provides improved durability of optically functional laminates and lenses in accelerated weathering tests compared to laminates and lenses formed from adhesives comprising polyester polyols and lenses formed from known, commercially available polarizer laminates.

Formation of Ophthalmic or Eyeglass Lenses

In certain embodiments, the optical or optically functional adhesive is employed to bond, attach, or otherwise couple an optical film, optical film laminate, or an optically functional film laminate to an exterior surface of a lens substrate. The lens substrate and the optical film or the bonding surface of the optical or optically functional film laminate is formed of a same or a different type of material relative to one another.

Figure 12:
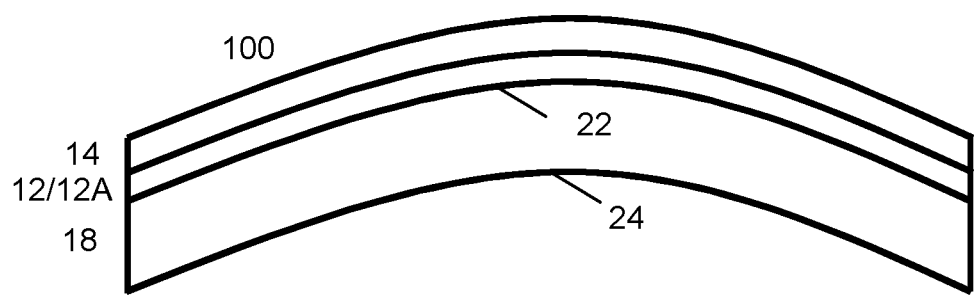
FIG. 12 is a cross-sectional view of an ophthalmic or eyeglass lens according to certain embodiments of the present invention.

In certain embodiments of the present invention, as shown in FIG. 12, a lens 100 is formed by employing the optical adhesive 12 and/or the optically functional adhesive 12A to bond, attach, or otherwise couple the transparent film 14 to a front optical surface 22 or a back optical surface 24 of the lens substrate 18. The attachment of the transparent film 14 to an optical surface of the lens substrate 18 is performed after formation of the lens substrate 18, e.g. after molding or casting of the lens substrate 18.

Figure 13:
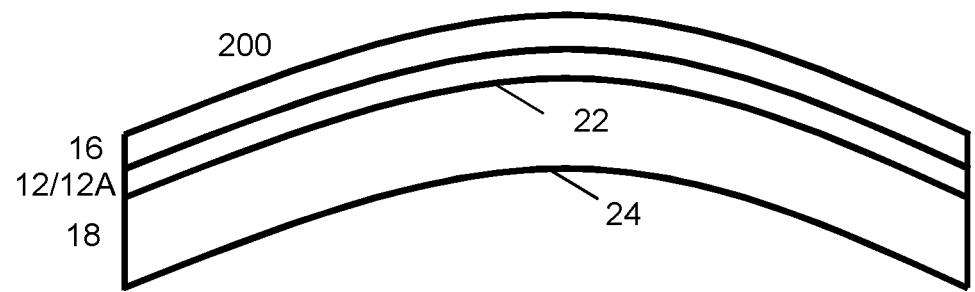
FIG. 13 is a cross-sectional view of an ophthalmic or eyeglass lens according to certain embodiments of the present invention.

In certain embodiments of the present invention, as shown in FIG. 13, a lens 200 is formed by employing the optical adhesive 12 and/or the optically functional adhesive 12A to bond, attach, or otherwise couple the optically functional film 16, as described above with regard to the formation of optically functional laminates employing optically functional film(s), to the front optical surface 22 or the back optical surface 24 of the lens substrate 18. The attachment of the optically functional film 16 to an optical surface of the lens substrate 18 is performed after formation of the lens substrate 18, e.g. after molding or casting of the lens substrate 18.

Figure 14:
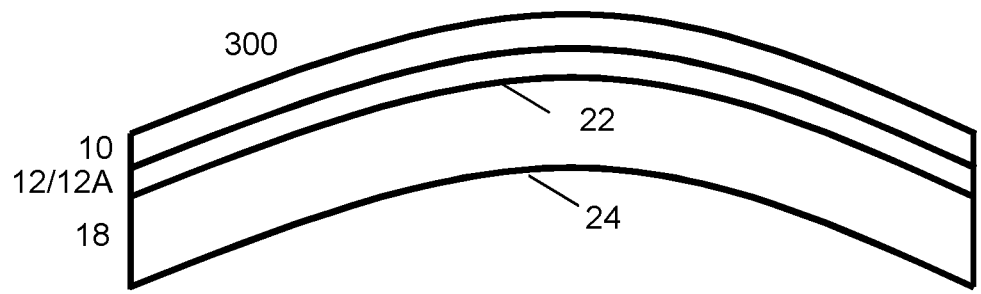
FIG. 14 is a cross-sectional view of an ophthalmic or eyeglass lens according to certain embodiments of the present invention.

In certain embodiments of the present invention, as shown in FIG. 14, a lens 300 is formed by employing the optical adhesive 12 and/or the optically functional adhesive 12A to bond, attach, or otherwise couple the optically functional laminate 10 to the front optical surface 22 or the back optical surface 24 of the lens substrate 18. The attachment of the optically functional laminate 10 to an optical surface of the lens substrate 18 is performed after formation of the lens substrate 18, e.g. after molding or casting of the lens substrate 18.

Additional details relating to the attachment of a film or film laminate to an optical surface of a lens substrate are described in U.S. Pat. No. 9,778,485 to Chiu et al., the contents of which are herein incorporated in their entirety by reference.

In embodiments of the present invention in which more than one layer of the inventive optical adhesive is employed to form an optical film laminate, an optically functional laminate and/or to bond, attach, or otherwise couple an optical film laminate, an optically functional film laminate, and/or an optically functional film to an ophthalmic or eyeglass lens, the different optical adhesive layers are the same, i.e. are formed by employing the same components using the same method. Alternatively, the different optical adhesive layers are different or distinct from one another, i.e. are formed by employing different components and/or by using different methods.

Advantageously, in embodiments of the present invention in which more than one layer of the inventive optical adhesive is employed to form an optical film laminate, an optically functional laminate and/or to bond, attach, or otherwise couple an optical film laminate, an optically functional film laminate, and/or an optically functional film to an ophthalmic or eyeglass lens, robust adhesion to the subject films and/or lens substrate does not require utilizing a primer layer or other pretreatment of the surfaces of the subject films and/or lens substrates.

Figure 15:
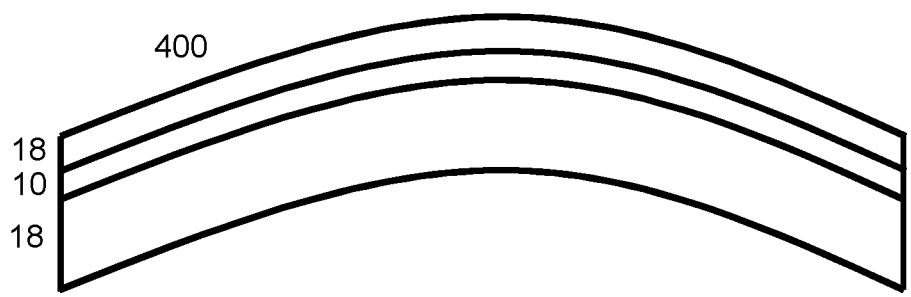
FIG. 15 is a cross-sectional view of an ophthalmic or eyeglass lens according to certain embodiments of the present invention.

In certain embodiments of the present invention, the optical laminate and/or optically functional laminate employing the inventive optical adhesive and/or optically functional adhesive are incorporated into a lens during formation of the lens substrate. For example, as shown in FIG. 15, a lens 400 is formed by incorporating the optical film laminate or the optically functional film laminate 10 into the lens substrate 18 such that the optical film laminate or the optically functional film laminate 10 is molded or cast within the lens substrate 18, i.e. between layers of the lens substrate 18. In this embodiment, the inventive optical adhesive and/or optically functional adhesive is not employed to bond, attach, or otherwise couple the functional film laminate 10 with the lens substrate 18. Such lenses incorporating film laminates are produced, for example, through cast molding techniques which are described in greater detail in the Assignee's U.S. application Ser. No. 15/379,287, the contents of which are herein incorporated in their entirety by reference.

Figure 16:
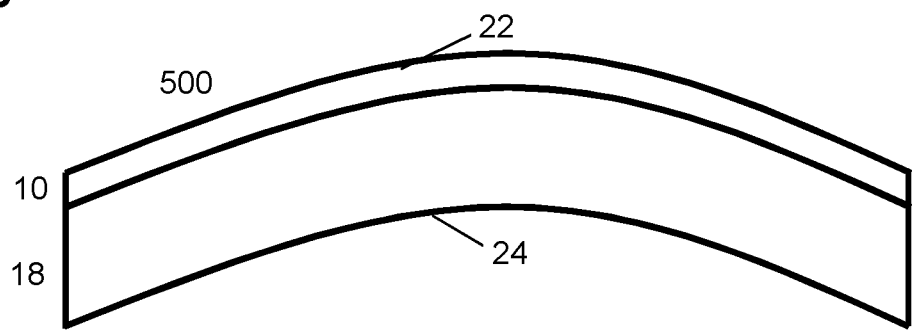
FIG. 16 is a cross-sectional view of an ophthalmic or eyeglass lens according to certain embodiments of the present invention.

In certain embodiments of the present invention, as shown in FIG. 16, a lens 500 is formed by incorporating the optical laminate and/or the optically functional film laminate 10 into the lens substrate 18 such that the optical laminate and/or the optically functional film laminate 10 is molded or cast into the lens substrate 18 and forms the front optical surface 22 or the back optical surface 24 of the lens substrate 18. In this embodiment, the inventive optical adhesive and/or optically functional adhesive is not employed to bond, attach, or otherwise couple the functional film laminate 10 with the lens substrate 18. Such lenses incorporating film laminates are produced, for example, through injection molding techniques which are described in greater detail in the Assignee's U.S. Pat. No. 5,827,614, the contents of which are herein incorporated in their entirety by reference.

In certain embodiments of the present invention, any combination of the above-described orientations and methods of formation of lens substrate and optically functional laminate are employed to form an ophthalmic or eyeglass lens.

In certain embodiments of the present invention, the lens substrate employed is a thermoplastic or thermoset or UV curable material. For example, lens substrates according to the present invention include, but are not limited to: polycarbonates (e.g. LEXAN available from Sabic, Makrolon supplied by Covestro and Panlite from Tejin); polyamide such as Rilsan resin from Arkema; acrylics; urethanes; thio-urethanes; polyurea-urethanes; thioepoxy such as KOC 70 supplied by KOC Solution; polymers based on allyl diglycol carbonate monomers with 1.50 index (e.g. CR-39 available from PPG Industries, Inc. or the optical monomers from RAV7 series and supplied by Mitsui Chemicals); high and mid-index lens materials with refractive index up to 1.80, such as the MR series monomers from Mitsui chemicals based on polyisocyanate poly thiol monomers (MR-7 and MR-10 with 1.67 index, MR-8 and MR-8 plus with 1.60 index, MR-174 having refractive index of 1.74); urethane-based monomers from KOC Solution such as KT 56, KT60; and urethane based prepolymer compositions (e.g. such as Trivex from PPG). The lens substrate can also be categorized as ultra-high refractive index such as the LumipluS supplied by Mitsubishi Gas Chemical.

In certain embodiments of the present invention, the lens substrate employed is a lens blank, a finished lens, a plano lens, a lens having a convex optical surface and a concave optical surface, a single vision lens, a multifocal lens, a bifocal lens, a trifocal lens, a progressive addition lens, a corrective lens, an eyeglass lens employing one or more arrays of microlenses, a sunglass lens, or a combination thereof.

EXAMPLES

Synthesis Example 1: Isocyanate-Terminated Prepolymer

Into a 75-gallon steel reactor were charged: 68.5 lbs. of DURANOL™ G3450J (manufactured by Asahi Kasei Chemicals Corporation); 98.9 pounds of Poly-THF 1000 purchased from BASF; and 106.8 pounds of THF. After the mixture was mixed until homogenous, 84.5 pounds of H12MDI was added under stirring followed by addition of 1.26 lbs. of 5% T-12 (from Air Products) solution in THF. The temperature of the reactor was maintained between 50-55 degree Celsius for one hour then cooled down below 35 degree Celsius before discharging the prepolymer into a steel container. A sample of the prepolymer was drawn from the reactor and tested with 3.15 percent NCO.

Synthesis Example 2: Optical Adhesive Composition

Into a 125 ml glass vial were charged 0.55 grams of Tinuvin 144, 0.28 grams of Irganox 1010, 0.39 grams of Di-TMP, 1.80 grams of 20% 1,4-butanediol solution in THF, 8.09 grams of THF and 1.91 grams 20 percent water solution in THF. The mixture was mixed on the lab roller mixer until all solids were dissolved. The isocyanate terminated prepolymer (76.4 grams) as prepared in the Example 1 was then added and mixed on the roller mixer overnight. The composition was degassed by ultrasonic before coating application.

Laminate and Lens Example 1: Polarizer Laminate Formed by Direct Coating Method On each of two polycarbonate sheets (127 mm×279.4 mm×0.3048 mm) was coated with approximately 3.0 grams of the adhesive composition prepared in Synthesis Example 2 by using a BYK drawdown coating bar to obtain a coated film with a dried thickness of approximately 40-42 micrometers. The two sheets of the coated substrates were heated at 65 degree Celsius in an oven for 10 minutes then laminated with each side of a polarizing PVA film on a laminator. The laminate was later cured at 70 degree Celsius for 96 hours, punched in to wafers and molded into 6-base lenses with polycarbonate resin.

Laminate and Lens Example 2: Polarizer Laminate Formed by Release Liner Coating Method On each of two PET based release liners (127 mm×279.4 mm×0.0762 mm) was coated with approximately 3.0 grams of the adhesive composition prepared in Synthesis Example 2 by using a BYK drawdown coating bar to obtain a coated film with a dried thickness of approximately 40-42 micrometers. The two sheets of the coated release liner were heated at 65 degree Celsius in an oven for 10 minutes then laminated with polycarbonate sheets (127 mm×279.4 mm×0.3048 mm) separately. Each release liner was peeled off from the laminate followed by attaching the adhesive side to each side of the polarizing PVA film on a laminator. The laminate was later cured at 70 degree Celsius for 96 hours, punched in to wafers and molded into 6-base lenses with polycarbonate resin.

Synthesis Example 3: Photochromic Adhesive Composition

Into a 2500 ml glass container were charged: 19.18 grams of Di(trimethylolpropane); 27.40 grams of Tinuvin 144; 13.70 grams of Irganox 1010; 17.81 grams of 1,4-butanediol; 53.98 grams of a photochromic dye mixture obtained from proprietary dye supplier; 717 grams of THF; and 18.91 grams of deionized water. The glass container was put in a hot water (45-55 degree Celsius) bath and gently shaken for 5-10 minutes until all solids were dissolved. The above solution was then transferred into a 5-gallon HDPE-plastic container pre-filled with 3658.5 grams of the isocyanate-terminated prepolymer prepared in the Synthesis Example 1. The photochromic composition was stirred with an overhead air-driven mixer at room temperature for 20 minutes until homogenous solution was obtained and then was allowed to stand for 15 hours, during which time the composition was degassed by two 15 minutes stirrings; one was performed after 2 hours, and another was after 13 hours.

Laminate and Lens Example 3: Photochromic Laminate Formed by Release Liner Coating Method The Photochromic Adhesive Composition prepared in Synthesis Example 3 was casted on PET based release liner through a die slot to form a wet film. The solvent in the casted film was evaporated through a two-zone oven, in which the first zone temperature was about 185 degree Fahrenheit, and the second zone temperature was about 295 degree Fahrenheit. The drying time was 30 seconds in each zone. The dried film having a thickness of 1.65 mil was then laminated with a polycarbonate resin sheet of 15 mil thick with a roller laminator. The release liner was peeled off followed by further laminating the film with another polycarbonate resin sheet of 12 mil thick. After six days under ambient, the laminate was cured at 158 degree Fahrenheit for four days. The laminate was cut into wafers and injection molded into 6-base lenses with polycarbonate resin.

Comparative Synthesis Example 4: Isocyanate-Terminated Prepolymer

Into a 500-ml glass jar were charged 198.35 grams of polycaprolactone (CAPA 2101A from Perstorp, with an OH value of 113.69 mg KOH/g) and 98.58 grams THF. After the mixture was mixed until homogenous, 101.57 grams of H12MDI (31.87 percent NCO, from Bayer Polymers) was added followed by addition of 1.5 grams of 5 percent T-12 (from Air Products) solution in THF. The mixture was mixed for one hour then stored at room temperature for 4 days before using. A sample of the prepolymer was drawn and tested to have 3.94 percent NCO (calculated 3.86 percent NCO).

Comparative Synthesis Example 5: Adhesive Composition

Into a 125-ml glass vial were charged; 0.55 grams of Tinuvin 144; 0.28 grams of Irganox 1010; 0.39 grams of Di-TMP; 1.80 grams of 20 percent 1,4-butanediol solution in THF; 13.12 grams of THF; and 2.0 grams (20 percent water) solution in THF. The mixture was mixed on the lab roller mixer until all solids were dissolved. 71.28 grams of the isocyanate-terminated prepolymer prepared in Comparative Synthesis Example 4 was then added and mixed on the roller mixer overnight. The composition was degassed by ultrasonic before coating application.

Comparative Laminate and Lens Example 4: Polarizer Laminate by Direct Coating Method On each of two polycarbonate sheets (127 mm×279.4 mm×0.3048 mm) was coated with approximately 3.0 grams of the adhesive composition prepared in Comparative Synthesis Example 5 by using a BYK drawdown coating bar to obtain a coated film with a dried thickness of approximately 40-42 micrometers. The two sheets of the coated substrates were heated at 65 degree Celsius in an oven for 10 minutes then laminated with each side of a polarizing PVA film on a laminator. The laminate was later cured at 70 degree Celsius for 96 hours, punched in to wafers and molded into 6-base lenses with polycarbonate resin.

Comparative Laminate and Lens Example 5: Polarizer Laminate by Release Liner Coating Method On each of two PET based release liners (127 mm×279.4 mm×0.0762 mm) was coated with approximately 3.0 grams of the adhesive composition prepared in Comparative Synthesis Example 5 by using a BYK drawdown coating bar to obtain a coated film with a dried thickness of approximately 40-42 micrometers. The two sheets of the coated release liner were heated at 65 degree Celsius in an oven for 10 minutes then laminated with polycarbonate sheet (127 mm×279.4 mm×0.3048 mm) separately. Each release liner was peeled off from the laminate followed by attaching the adhesive side to each side of the polarizing PVA film on a laminator. The laminate was later cured at 70 degree Celsius for 96 hours.

Comparative Laminate and Lens Example 6

A commercially available polarizer laminate provided by outside supplier was punched into wafers and molded into 6-base lenses with polycarbonate resin.

Comparative Laminate and Lens Example 7

A photochromic laminate was prepared as described in Laminate Example L6 disclosed in the Assignee's U.S. Pat. No. 9,081,130, the contents of which are herein incorporated in their entirety by reference. A lens was formed as described in U.S. Pat. No. 9,081,130 with regard to the Accelerated Weathering Test.

Synthesis Example 6: Hydroxyl-Terminated Prepolymer

Into a 250-ml glass bottle were charged 25.69 grams of DURANOL™ G3450J (manufactured by Asahi Kasei Chemicals Corporation); 25.70 grams of Terathane-1000 purchased from Invista; and 126.86 grams of THF. After the mixture was mixed to homogenous, 17.88 grams of H12MDI was added under stirring followed by addition of 0.35 grams of 5 percent T-12 (from Air Products) solution in THF. The mixture was allowed to react at ambient condition for two hours followed by the addition of 0.7 grams of Di-water. The reaction was carried out under ambient temperature and monitored by GPC. The weight average molecular weight (Mw) was found to be 42394 Dalton after 7 days.

Synthesis Example 7: Photochromic Adhesive Composition

Into a 125 ml glass container were charged 0.37 grams of Tinuvin 144; 0.18 grams of Irganox 1010; 0.84 grams of photochromic dye, and 24.4 grams of THF. The mixture was mixed until all solids were completely dissolved. To the above solution were added 48.16 grams of the hydroxyl-terminated prepolymer prepared in Synthesis Example 6, followed by 1.84 grams of 24A-100 (manufactured by Asahi Kasei Chemicals Corporation), and 24.1 grams of the iso-cyanate-terminated prepolymer prepared in Synthesis Example 1. The composition was mixed at ambient condition for overnight before coating application.

Analysis of Failure Characteristics of Lenses Formed:

A group of lenses molded under similar conditions were subjected to the Accelerated Weathering Test described in U.S. Pat. No. 9,081,130. More particularly, Lenses were formed using the different formulations described above and were then subjected to a set of controlled conditions inducing delamination similar to that which is observed in the field.

The lenses were cut into a circular shape and ground with a consistent edge thickness of 3.0 millimeter. Mechanical pressure corresponding to a value of approximately 50 cN-m was applied around the lens edge with a circular clamp. After applying a mixture of artificial skin oils and artificial perspiration, the lenses are placed into a temperature and humidity chamber at 65 degrees Celsius and 95 present relative humidity, RH. These conditions are considered to be more aggressive than realistic field conditions, but with a failure mechanism very similar to that of field failures. The aggressive conditions accelerate the failure, providing performance feedback more quickly than can be gathered from the field.

After lenses were placed into a temperature and humidity chamber, they were inspected for delamination approximately every 24 hours. Delamination typically begins at the edge of the lens and expands along the edge of the lens as well as toward the center of the lens. When inspected, the delamination is measured by its penetration width from the edge of the lens. When the width reaches 1 millimeter, the lens is deemed a failure. A lens is evaluated by the number of hours required to become a failure, referred to here as the time to failure.

In each trial, a group of lenses of approximately 12-18 lenses, made under similar conditions and with similar laminates, were subjected to the weathering test described above. Time duration for 50% sample failure was recorded as the Median Life Time of the lens group and is shown below in Table 2.

TABLE 2

Accelerated Weathering Test Results.

| Examples | Median Life Time (hours) |
|---|---|
| Laminate & Lens Example 1 | 1832 |
| Laminate & Lens Example 2 | 1831 |
| Laminate & Lens Example 3 | 1139 |
| Comparative Laminate & Lens Example 4 | 235 |
| Comparative Laminate & Lens Example 5 | 280 |
| Comparative Laminate & Lens Example 6 | 857 |
| Comparative Laminate & Lens Example 7 | 453 |

The polyurethane-urea optical adhesive composition of the present invention enhances the adhesion of the laminate due, in part, to more hydrogen bonding from the polyurethane-urea system relative to known adhesives. It also provides a viable process for roll-to-roll laminate production. The current invention further advantageously eliminates the complicated surface treatment process which is described in U.S. Pat. No. 6,096,425. The polyurethane-urea system of the current invention, derived from aliphatic isocyanate, can also prevent the adhesive from becoming yellowed from UV exposure compared to the aromatic polyurethane described in U.S. Pat. No. 6,797,383.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. An optical adhesive comprising:
   a crosslinked polyurethane-urea;
   said crosslinked polyurethane-urea is formed from a composition comprising:
   a reactive isocyanate-terminated prepolymer comprising a mixture of at least two different polyols comprising a polycarbonate polyol and a polyether polyol and an aliphatic isocyanate comprising 4,4'-dicyclohexylmethanediisocyanate;
   a chain extender selected from the group consisting of: 1,6-hexanediol, 1,4-butanediol, 1,3-propanediol, hexamethylene diisocyanate, isophorone diisocyanate, and N,N',2-tris(6-isocyanatohexyl)imidodicarbonic diamide;
   a crosslinking agent selected from the group consisting of: trimethylolpropane, trimethylolmethane, glycerin, pentaerythritol, and di(trimethylolpropane); and
   water, wherein an equivalent ratio of the aliphatic isocyanate to water is in a range from 1.0 to 15.0;
   wherein urea linkages are present in a backbone of the crosslinked polyurethane-urea which includes a structure of R—NH—CO—NH—R', wherein R and R' are backbone polyurethane.

2. The optical adhesive of claim 1 wherein the polycarbonate polyol has the structure shown by Formula A

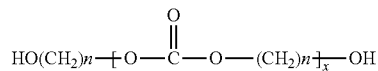

wherein "n" is equal to an integer from 3 to 6 or a combination thereof; "X" is an integer that makes the molecular weight of Formula A approximately equal to 500-2500 Daltons; and
the polyether polyol has the structure shown by Formula B

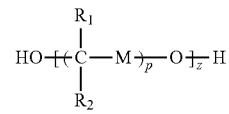

wherein "R1" and "R2" are hydrogen or an alkyl group; "p" is an integer from 1 to 3; "M" has a formula of $(CH_2)y$, wherein "y" is an integer from 1-5; and "z" is an integer that makes the molecular weight of Formula B approximately equal to 500-2500 Daltons.

3. The optical adhesive of claim 1 wherein the composition for the crosslinked polyurethane-urea comprises by weight: 20-45 percent of the aliphatic isocyanate; 20-40 percent of the polycarbonate polyol; 20-40 percent of the polyether polyol; 0.2-5 percent of the chain extender; 0.05-8 percent of the crosslinking agent; and 0.1-1.2 percent of water.

4. The optical adhesive of claim 1 wherein the composition further comprises an organic aprotic solvent.

5. The optical adhesive of claim 1 wherein the composition further comprises a photochromic dye.

6. An optically functional laminate comprising:
   a transparent film;
   an optically functional film; and
   a crosslinked polyurethane-urea adhesive adhering the transparent film to the optically functional film;
   wherein said crosslinked polyurethane-urea adhesive is formed from a composition comprising:
   a reactive isocyanate-terminated prepolymer comprising a mixture of at least two different polyols comprising a polycarbonate polyol and a polyether polyol and an aliphatic isocyanate comprising 4,4'-dicyclohexylmethanediisocyanate;
   a chain extender selected from the group consisting of: 1,6-hexanediol, 1,4-butanediol, 1,3-propanediol, hexamethylene diisocyanate, isophorone diisocyanate, and N,N',2-tris(6-isocyanatohexyl)imidodicarbonic diamide;
   a crosslinking agent selected from the group consisting of: trimethylolpropane, trimethylolmethane, glycerin, pentaerythritol, and di(trimethylolpropane); and
   water, wherein an equivalent ratio of the aliphatic isocyanate to water is in a range from 1.0 to 15.0;
   wherein urea linkages are present in a backbone of the crosslinked polyurethane-urea which includes a structure of R—NH—CO—NH—R', wherein R and R' are backbone polyurethane.

7. The optically functional laminate of claim 6 wherein the transparent film comprises polycarbonate.

8. The optically functional laminate of claim 6 wherein the optically functional film comprises a polarizing film.

9. The optically functional laminate of claim 6 wherein the optically functional film comprises polyvinyl alcohol.

10. The optically functional laminate of claim 6 wherein the polycarbonate polyol has the structure shown by Formula A

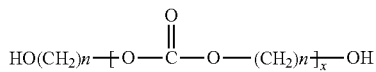

wherein "n" is equal to an integer from 3 to 6 or a combination thereof; "X" is an integer that makes the molecular weight of Formula A approximately equal to 500-2500 Daltons; and the polyether polyol has the structure shown by Formula B

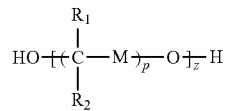

wherein "R1" and "R2" are hydrogen or an alkyl group; "p" is an integer from 1 to 3; "M" has a formula of $(CH_2)y$, wherein "y" is an integer from 1-5; and "z" is an integer that makes the molecular weight of Formula B approximately equal to 500-2500 Daltons.

11. The optically functional laminate of claim 6 wherein the crosslinked polyurethane-urea adhesive further comprises a photochromic dye.

* * * * *